UNITED STATES PATENT OFFICE.

ALFRED HOLDEN ILLINGWORTH, OF BEN RHYDDING, ENGLAND.

FISHING AND LIKE LINES.

998,341.  Specification of Letters Patent.  Patented July 18, 1911.

No Drawing.   Application filed September 23, 1909. Serial No. 519,249.

*To all whom it may concern:*

Be it known that I, ALFRED HOLDEN ILLINGWORTH, of 2 Highclere Villas, Ben Rhydding, in the county of York, England, wool merchant, subject of the King of Great Britain and Ireland, have invented certain new and useful Improvements in and Relating to Fishing and Like Lines, of which the following is a specification.

This invention relates to improvements in fishing and like lines, and has for its object means for weighting fishing lines, thereby allowing of lines of greater specific gravity being used in place of lines of less specific gravity and with such lines having been treated as hereinafter described, increased length of cast may be obtained as compared with casts made with ordinary line of equal thickness, owing to the increased weight in relation to the thickness. That is to say, a line treated in this way will be heavier than an untreated line of the same thickness, the advantage of which will be appreciated by those skilled in the art of fly-fishing.

In carrying out my invention, while I prefer taper plaited silk lines, I may apply the treatment to twisted silk lines or to cotton or other lines whether taper or level.

Broadly, my process of treatment consists of incorporating with the line mercury in some form or other. This may be done either chemically or mechanically and the mercury may be either the free metal or some mechanical compound or some salt of mercury. The mercury may be applied to the line by rubbing as a paint or ointment, in conjunction with a suitable medium. The medium may consist of any oxidizing oil or any evaporating oil; instances of the former are linseed oil and poppy oil, and of the latter, petroleum.

In order to make the mercury into a suitable emulsion, paint or ointment, a certain amount of some other heavy substance may with advantage be added—calomel or vermilion would be suitable for this purpose, mercury together with the calomel and a medium forming a grey amalgam or emulsion, the thickness or viscosity of which can be made as desired. Another method of applying metallic mercury to the line is by chemically reducing or precipitating the metal in the texture of the line. This may be done for instance by applying an aqueous solution of mercuric chlorid and afterward treating the line with an aqueous solution of stannous chlorid.

In place of applying metallic mercury to the line either by chemical or mechanical means as above described, insoluble salts of mercury may be precipitated in the line so as to make the line heavy and leave it in a suitable condition for the application of any subsequent dressing or water-proofing process. The following are instances of chemical compounds of mercury which give good results when so precipitated in the line. Black sulfid of mercury precipitated in the line by treating first with a soluble mercury salt and afterward by a compound of sulfur, as for instance an aqueous solution of mercurous nitrate, subsequently treated with ammonium sulfid; calomel precipitated in the line by an aqueous solution of mercurous nitrate or mercuric chlorid treated subsequently with chlorid of sodium.

Any suitable solvent may be used for dissolving the mercuric salt preparatory to applying it to the line, as for instance alcohol or glycerin; sulfur may also be applied in any convenient form, such as sulfureted hydrogen gas. Any other convenient precipitate may be used, but these are instances of many different ways of precipitating various mercury salts in the texture of the line, some of them being more suitable than others on account of the absence of deteriorating effect upon the strength of the line itself. The amount of weight which is added to a given line may be controlled by varying the amount of mercury applied.

The mercury may be incorporated in the line by submerging the line *in vacuo*, in metallic mercury, or emulsion containing mercury in a finely divided condition after the well-known air-pump method of dressing lines. A pigment may be added to give the line any desired color. The line may or may not be dressed or water-proofed subsequently to the above outlined treatment, by any of the usual methods. In practice, however, it is preferably water-proofed by the "air pump method." Any of these methods of treating or dressing will materially increase the specific gravity of the line; as much as 100% or more may be added if desired and the result is, that for a given weight of line the thickness is reduced by as much as one half, thereby enabling longer and more accurate casts to be made with a line so treated than the usual form. The resistance of the air is very much reduced, thereby the friction of the line on the rings of the fishing rod is reduced and the drag of the current upon the line in the water is less than with the ordinary line, which to obtain the same weight has to be considerably thicker.

The special purpose for which this improvement is recommended is for lines for dry fly fishing for trout, wet fly fishing for trout, salmon fly fishing, and incidentally to any form of line used for casting a lure which does not rely upon the weight of the lure itself, but relies upon the momentum of the line for the distance which the lure or fly may be thrown.

What I claim as my invention is:—

1. A fishing line having mercury incorporated therewith to increase the weight of the line.

2. A fishing line having mercury incorporated in the texture of the line to increase the weight of the line.

In witness thereof, I have hereunto set my hand, in the presence of two witnesses.

A. HOLDEN ILLINGWORTH.

Witnesses:
 CLIVE WAUGH,
 JOSEPH P. KIRBY.